Feb. 15, 1966  B. E. ILON  3,235,278
OBSTACLE OR STAIR-CLIMBING TRAILER
Filed Oct. 28, 1963  2 Sheets-Sheet 1

INVENTOR
BENGT ERLAND ILON
BY
ATTORNEYS ered Feb. 15, 1966

3,235,278
OBSTACLE OR STAIR-CLIMBING TRAILER
Bengt Erland Ilon, Stromkarlsvagen 43,
Bromma, Sweden
Filed Oct. 28, 1963, Ser. No. 319,306
Claims priority, application Sweden, Sept. 11, 1963,
9,935/63
5 Claims. (Cl. 280—5.28)

The present invention relates to a trailer or other vehicle which is provided with a dragpoint. Known vehicles of this type can comparatively easily pass rather considerable obstacles, and are therefore used to advantage in rough ground passable only with difficulty, for example, on stairs. However, obstacles which hit the wheels on the level of their centers cause special difficulties which make it quite impossible to use such vehicles. It is the primary purpose of this invention to solve this problem.

The invention will be described below with reference to the attached drawing in which.

Figure 1:
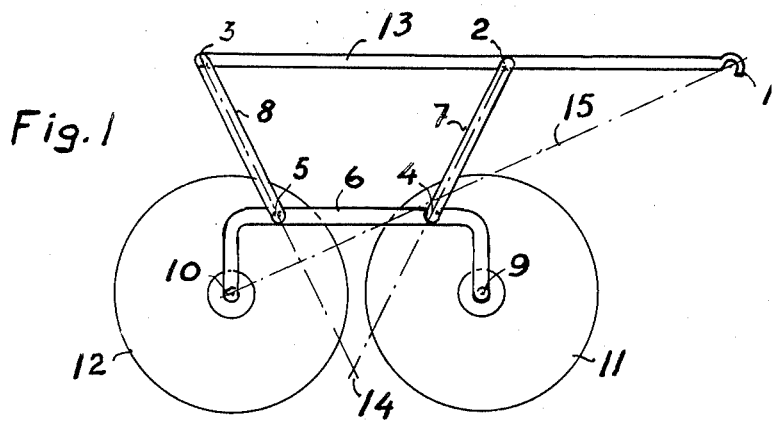
FIGURE 1 is a schematic view of a trailer of the invention in a normal position.

The vehicle according to FIGURE 1 is provided with a dragpoint in the form of a hook 1, and with a wheel attachment forming a four-joint with two upper and two lower joints 2, 3 and 4, 5 respectively consisting of journals. The lower joints 4, 5 are arranged on a beam or bar 6, which by means of pivot arms 7, 8 is swingably supported by the upper joints. Wheels 11, 12 are borne on journals 9, 10 arranged on the beam 6. The upper joints are arranged on an upper beam 13 which may be the upper part of the vehicle or the base-frame thereof and upon which the dragpoint 1 is arranged. The distance between the lower joints 4, 5 is smaller than the distance between the upper joints 2, 3 whereby the center lines of the two pivot arms 7, 8 converge and intersect in a point 14 situated below the connecting line 15 between the drag-point 1 and the center of the rear wheel.

Figure 2:
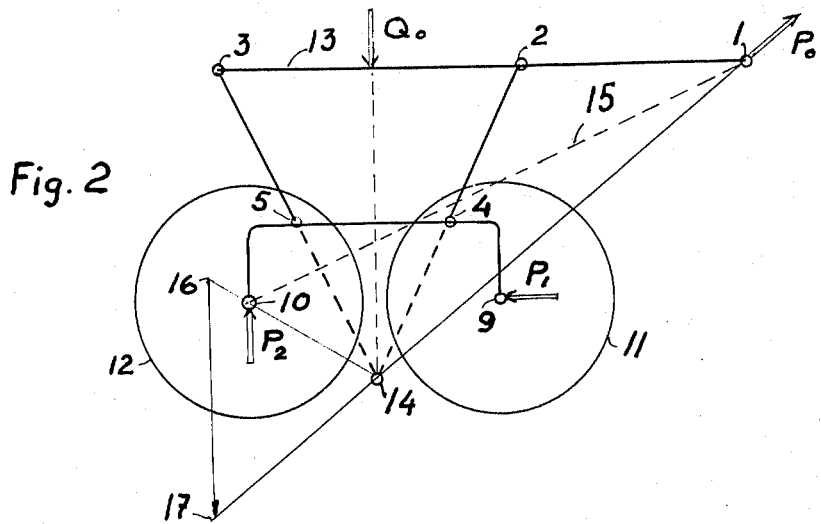
FIGURE 2 is a digrammatic view of the trailer of FIGURE 1 showing one set of force conditions.
Figure 3:
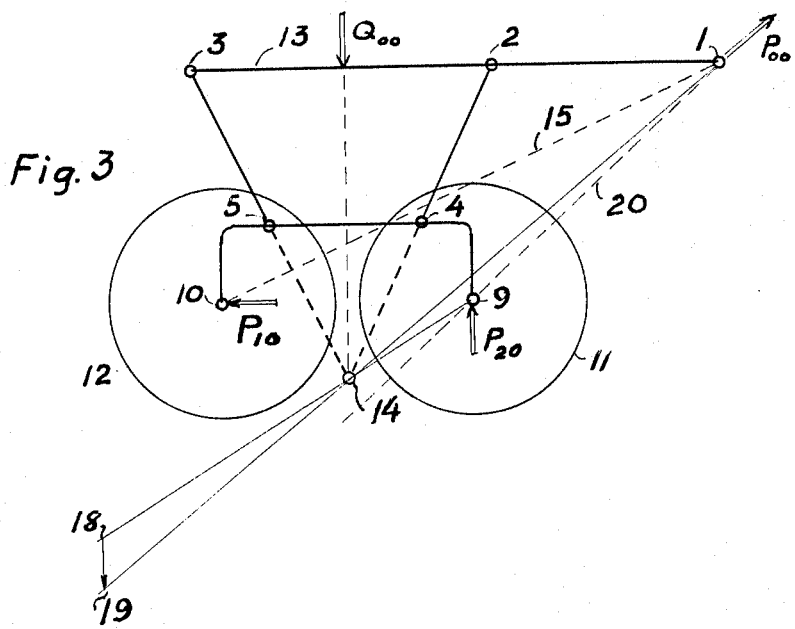
FIGURE 3 is a diagrammatic view of the trailer of FIGURE 1 showing a second set of force conditions.

In the diagrammatic FIGURE 2 and 3, the same numbers have been used as for the corresponding details of FIGURE 1. According to FIGURE 2, the front wheel is supposed to hit a vertical obstacle corresponding to a horizontal force $P_1$ level with the center of the wheel 9, whereas the rear wheel is acted upon by a vertical upwards directed force $P_2$. The vehicle is further acted upon by a draught force $P_0$ and a load $Q_0$ located centrally between the wheels. It can be proved that in this case the upper beam 13 is acted upon by the force system illustrated by the triangle 14–16–17, if line 16–17 represents the load $Q_0$, whereby line 17–14 represents the draught force $P_0$ and line 14–16 the resultant force from the pivot arms 7, 8. From this may be seen that the condition necessary for the force $P_0$ to remain finite and positive is contained in the supposition that the point 14 is situated below the line 15.

According to FIGURE 3, it is supposed that the rear wheel 12 hits a vertical obstacle corresponding to a horizontal force $P_{10}$ in level with the center of the wheel, whereas the front wheel is acted upon by a vertical force $P_{20}$ directed upwards. The vehicle is further acted upon by a draught force $P_{00}$ and a load $Q_{00}$ located centrally between the wheels. It can here be proved, in the same manner as in FIGURE 2, that the upper beam 13 is acted upon by a force system represented by the triangle 14–18–19, whereby line 18–19 corresponds to the load $Q_{00}$, line 19–14 corresponds to the draught force $P_{00}$ and line 14–18 to the resultant force from the pivot arms 7, 8. The condition necessary for the force $P_{00}$ to remain finite and positive in this case is contained in the supposition that the point 14 lies between the lines 15 and 20 through the dragpoint and the two wheel centers 9, 10. Thereby the rear wheel of the wheel attachment can pass a vertical obstacle also in the more or less extreme case when the obstacle hits the wheel level with its axle center.

Figure 4:
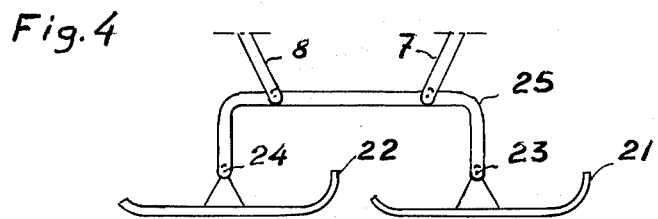
FIGURE 4 is a schematic view of an alternative embodiment.

The vehicle illustrated in FIGURE 4 is provided with two skids 21, 22 which are pivotally borne each on one of the axles 23, 24 on the beam 25 which is attached to the lower ends of the pivot arms 7 and 8.

Figure 5:
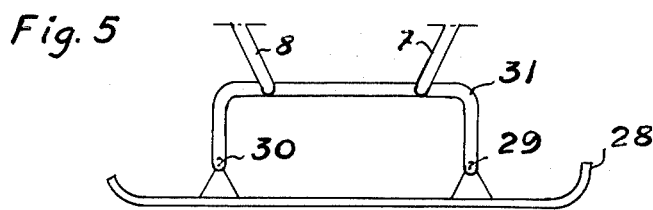
FIGURE 5 is a schematic view of an alternative embodiment.

In the embodiment according to FIGURE 5 there is only one skid 28, which is attached to the two axles 29, 30 and thus moves with the beam 31 supporting the axles as a unity. Beam 31 is pivotally connected to pivot arms 7 and 8.

From the foregoing, it will be seen that according to the invention, the intersection between the center lines of the pivot arms, at least when the pivot arms take a normal position as when the roller or skid means are on one and the same level, is located below the line connecting the drag-point and the center of the rear axle. Thereby the occurrence of a locked position for the front part of the wheel or runner attachment will be prevented. For the rear part of the wheel or runner attachment the corresponding inconvenience may in certain cases be prevented thereby that the distance between the roller or skid means is made so small that a vertical obstacle of sufficient stability and necessary height cannot get in the front of the rear roller or skid means which implies that the said distance is about equal to the longitudinal extension of the parts of the roller or skid means situated between the axles. In other cases, where for certain reasons it is necessary to keep a greater distance between the roller or skid means, the inconvenience in question will be avoided if said intersection is located between the two lines connecting the dragpoint with the two axle centers.

The vehicle according to the invention has been described above and illustrated in the drawing as consisting of a four-joint system symmetrical with respect to the intersection point 14. However, the invention is not limited to such a system. The pivot arms may as an example be of different length, and the load may be situated in such a manner that the force Q is on one or the other side of the perpendicular through the point 14.

According to its kind the vehicle may be provided with one or more wheel or runner attachments. Usually two attachments are arranged side by side in such a manner that the axles of one wheel or runner attachment are coaxial each with one of the axles of the other wheel or runner attachment. Also four wheel or runner attachments may be used whereby these are suitably in pair displaced relative to each other in the longitudinal direction of the vehicle.

What is claimed is:

1. A vehicle comprising a frame having a dragpoint, a pair of pivot arms pivotally connected to and depending from the frame, a beam pivotally connected to the arms, the distance between the pivotal connections of the arms to the frame being greater than the distance between the pivotal connections of the beam to the arms, and front and rear ground traversing means pivotally connected to said beam, with the vehicle on level ground said arms lying in planes which intersect below a plane passing through the dragpoint and the center of the pivotal connection of the rear ground traversing means to the beam and above a plane passing through the dragpoint and the center of the pivotal connection of the front ground traversing means to the beam.

2. A vehicle in accordance with claim 1 in which the ground traversing means are wheels.

3. A vehicle in accordance with claim 1 in which the ground traversing means are skids.

4. A vehicle comprising a frame having a dragpoint, a pair of pivot arms pivotally connected to and depending from each side of the frame, a beam pivotally connected to the arms, the distance between the pivotal connections of each pair of the arms to the frame being greater than the distance between the pivotal connections of the beam to the pair of arms, and a pair of front and a pair of rear ground traversing means pivotally connected to said beam, with the vehicle on level ground each said pair of arms lying in planes which intersect below a plane passing through the dragpoint and the center of the pivotal connections of the pair of rear ground traversing means to the beam and above a plane passing through the dragpoint and the center of the pivotal connections of the pair of front ground traversing means to the beam.

5. A vehicle comprising a frame having a dragpoint, a pair of pivot arms pivotally connected to and depending from the frame, a beam pivotally connected to the arms, the distance between the pivotal connections of the arms to the frame being greater than the distance between the pivotal connections of the beam to the arms, and front and rear ground traversing means pivotally connected to said beam and having a longitudinal extension between the last mentioned pivotal connections about equal to the distance between the last mentioned pivotal connections, with the vehicle on level ground said arms lying in planes which intersect below a plane passing through the dragpoint and the center of the pivotal connection of the rear ground traversing means to the beam.

References Cited by the Examiner

UNITED STATES PATENTS

| 1,014,292 | 1/1912 | Fried | 280—5.28 |
| 2,926,021 | 2/1960 | Altadonna | 280—5.2 X |

FOREIGN PATENTS

| 178,337 | 2/1962 | Sweden. |
| 53,681 | 7/1910 | Switzerland. |

LEO FRIAGLIA, *Primary Examiner.*